United States Patent Office 3,535,220
Patented Oct. 20, 1970

3,535,220
BULK POLYMERIZED, FLUIDIZED BED, AFTER-CHLORINATED POLYVINYL CHLORIDE
Ryuichi Kato, Nagoya, Isao Soematsu, Tokyo, and Hideo Itabashi, Nagoya, Japan, assignors to Toa Gosei Kagaku Kogyo Kabushiki Kaisha, Tokyo, Japan, a corporation of Japan
No Drawing. Filed July 28, 1965, Ser. No. 475,598
Int. Cl. C08f 27/03
U.S. Cl. 204—159.18                                        4 Claims

ABSTRACT OF THE DISCLOSURE

A process is provided for post-chlorinating a dried, powdery polyvinyl chloride obtained by bulk polymerization by fluidizing the PVC at 40–100° C. in the presence of ultraviolet light utilizing chlorine as the fluidizing medium, the fluidizing medium also preferably including vapor of a lower aliphatic chlorinated hydrocarbon and an inert gas.

---

The present invention relates generally to an improved process for the chlorination of polyvinyl chloride resins and more particularly pertains to the improved method for rapidly chlorinating polyvinyl chloride resins comprising conducting the chlorination reaction in the gas phase under the irradiation of ultraviolet light.

Since polyvinyl chloride can be produced at a cost lower than any other kind of resin and possesses superior physical and chemical properties, it has found its way into a multitude of useful applications in the form of molded articles, fibers and the like. However, most products found in the market have not been satisfactory in the point of heat stability and many attempts have been made repeatedly to subject it to post-chlorination in order to overcome this point. The post-chlorination of this resin is carried out by dissolving or suspending the resin in a solvent or a swelling agent such as chlorinated hydrocarbon or the like and subjecting it to the action of heat, catalyst, light or the like. According to a recent report, the object of post-chlorination has been attained by suspending the resin in water and subjecting to the light-chlorination reaction in the presence of hydrochloromethylene as a swelling agent. However, the methods using a solvent have considerable extent of difficulties in the point that they require several steps in the removal of solvent, swelling agent, chlorine and water after the completion of reaction and that resulting chlorinated products have poor heat stability. In contrast to the above-mentioned liquid phase chlorination, there have been known gas phase chlorination methods. For example, a method in which chlorination is carried out under the irradiation of ultra-violet light while maintaining powdered polyvinyl chloride having a large surface area at a temperature lower than its melting point (G.P. 801,304, G.P. 1,110,873) and another in which the chlorination is carried out in the presence of a small quantity of steam while maintaining powdered polyvinyl chloride having particle sizes less than 1 mm. at a temperature of 50° to 150 C. (U.S.P. 2,590,651) have been known, but it has been difficult to yield post-chlorinated polyvinyl chloride having sufficient heat stability.

An object of the present invention is to provide a novel method for the post-chlorination of polyvinyl chloride in which the above-mentioned drawbacks of conventional method have been overcome. Another object of the present invention is to provide a method for producing post-chlorinated polyvinyl chloride having a high softening point, superior heat stability and excellent light transmittability. These objects and other advantages can be attained by the present invention which consists in a method comprising chlorinating at dry state dried powdered polyvinyl chloride produced by a bulk polymerization process under the irradiation of ultraviolet light and with use of gaseous chlorine. The present invention consists also in a method comprising chlorinating at dry state dried powdered polyvinyl chloride produced by a bulk polymerization process under the irradiation of ultraviolet light while fluidizing the said powdered polyvinyl chloride with use of gaseous chlorine in the presence or absence of a chlorinated lower alkyl hydrocarbon.

It is one of the essential points of the present invention that dried powdered polyvinyl chloride produced by a bulk polymerization process is used in the reaction. The bulk polymerization herein referred to is a process generally used in the production of polymers or copolymers which are insoluble in their monomer or mixture of monomers. In the bulk polymerization of vinylchloride, the polymerization is carried out at a temperature of 40° to 80° C. preferably 50° to 70° C. in the presence of a radical forming catalyst such as azobis-isobutyronitrile, lauroyl peroxide, diisopropyl peroxy carbonate while stirring the liquid vinyl chloride monomer. As a reactor for carrying out such a polymerization, a revolving type autoclave charged with balls for the purpose of agitation is generally used. The polyvinyl chloride produced by such a bulk polymerization is different from the polymer produced by a suspension or emulsion polymerization in the point that the former contains smaller amounts of compounds which may cause various undesirable coloration on finished products because the former uses less additives in the prouction. The smaller content of such impurities provides the resulting polyvinyl chloride with unique porous surface structure as is apparent from the data on specific surface area disclosed in the examples given hereafter, good fluidability in gas current and easiness of chlorination which are all favorable factors in carrying out the present invention.

The reaction and the fluidization can be carried out smoothly with use of polyvinyl chloride powder ground to sizes smaller than about 250μ (60 mesh) but the distribution range of particle size must not be so broad as to increase the loss of resin in the chlorination and to bring about problem upon bulkiness. Accordingly it is desirable that the particle size of resin be as uniform as possible.

In the practice of the present invention, powdered polyvinyl chloride obtained by a bulk polymerization process is chlorinated by chlorine gas or a mixture of chlorine gas and an inert gas under irradiation of ultra-violet light but it is desirable that polyvinyl chloride is maintained at fluidized state by a chlorine-containing gas. In order to fluidize powdered polyvinyl chloride, it is charged in an elongated reaction tube upon a gas distributing plate placed in the inside of this tube and chlorine gas or a gaseous mixture of chlorine and an inert gas is passed through this tube at a linear velocity sufficiently greater than a certain value necessary to fluidize it. The inert gas herein referred to is such a gas as nitrogen, carbon dioxide, or the like which has no activity to all the materials used in the reaction. Off-gas from the reactor having served the purpose of fluidization and chlorination are recirculated again after being supplemented with a suitable amount of chlorine.

The chlorination of polyvinyl chloride is carried out by irradiating powdered resin with ultra-violet light having wave lengths ranging from 2,000 to 5,000 A. This chlorination is naturally an exothermic reaction and with use of a suitable concentration of chlorine gas and irradiation of ultra-violet light, it proceeds rapidly yielding post-chlorinated polyvinyl chloride having about 65 percent by weight chlorine content within an early period of reaction time. However, if post-chlorinated polyvinyl chloride having higher chlorine content is desired, it is necessary to employ longer time and higher reaction temperature. The reaction temperature is, however, maintained at the highest at 100° C., preferably at a temperature from 40° to 80° C. from the point of heat stability and danger of melting of resin. When the reaction is carried out by fluidization, the temperature can be maintained very uniformly. Hence the fluidization is a very suitable process for the chlorination reaction of the heat-sensitive polyvinyl chloride. The control of the temperature in the reaction zone can be effected perfectly by adjusting concentration of chlorine gas, gas velocity, preheating temperature, and if necessary, quantity and temperature of heating (or cooling) gas circulating the outside of the reactor. Since the resin powder obtained by post-chlorination occules unreacted chlorine gas or hydrochloric acid gas by-produced in the reaction, it is desirable to wash the resulting resin powder with air or nitrogen gas by fluidization or to expose to a reduced pressure.

Thus it is possible to elevate the softening point of polyvinyl chloride from the original value of 74°–75° C. to 80°–150° C. or more.

The heat stability of post-chlorinated polyvinyl chloride can be somewhat elevated by admixing a chlorinated saturated or unsaturated lower aliphatic hydrocarbon vapour such as methyl chloride, methylene chloride, chloroform, dichloroethylene, dichloroethane, trichloroethylene or the like to chlorine gas or a gaseous mixture of chlorine and an inert gas.

As for methods for admixing the above-mentioned chlorinated lower aliphatic hydrocarbon, it goes without saying that the passing of the chlorine gas or a mixture of chlorine gas and an inert gas through the said chlorinated hydrocarbon in order to saturate vapor of the latter in the former is effective, but it is necessary to pay attention so as not to have the former contain so much vapor as to hinder the smooth proceeding of fluidization on account of wetting, swelling or coagulating of resin powder. When such a saturation method is used, 1,2-dichloroethylene is most effective and the effectiveness is reduced in the order of chloroform, methylene chloride, dichloroethylene, 1,2-dichloroethane and 1,1,2-trichloroethane. Since the reaction temperature is lower than 100° C., it is preferable to select a chlorinated lower aliphatic hydrocarbon having a boiling point lower than 100° C.

The post-chlorinated polyvinyl chloride obtained in accordance with the present invention have a stability sufficient to undergo milling with other compounding materials on a mill without decomposition. Usually about one to 10 parts by weight of stabilizer is added to 100 parts by weight of finished resin, and the resulting mixture is milled in a Banbury mixture, an extruder or the like and then subjected to molding to shape into products.

Representative stabilizers useful for the post-chlorinated polyvinyl chloride obtained by the present invention include dibutyl tin laurate, barium, cadmium-, calcium- or lead-salt of lauric acid or stearic acid, tin salt of maleic acid, epoxide type esters and compound similar to the foregoing. Compounds such as tribasic lead sulfate and the like are also useful as stabilizers.

The same kinds of plasticizers, fillers, extenders, colorants, pigments, molding assistants, lubricants or common additives as those used in common polyvinyl chloride can be used in the post-chlorinated polyvinyl chloride obtained in accordance with the present invention by employing the common techniques.

The present invention may be more fully understood from the following examples which are offered by way of illustration and not by way of limitation. Properties of resin described in the examples were measured in accordance with following methods.

(1) Specific viscosities were measured with Ubbelohde's viscosimeters as 40 g./l. nitrobenzene solutions of resins at a temperature of 30° C. in accordance with JISK6721.

(2) Specific surface areas were measured by an air permeating method with a measuring apparatus for specific surface area of powder supplied by Shimazu Seisakusho.

(3) Chlorine contents were measured by Carius method.

(4) Softening points were measured by determining the temperatures at a rigidity of $G = 3.17 \times 10^3$ kg./cm.$^2$ with use of a Crashberg softening-temperature-measuring apparatus in accordance with JISK6745.

(5) Heat stabilities were measured by determining the times required to cause browning at a temperature of 200° C. of 10–30 mesh pellets obtained by grinding milled sheets.

(6) Quantities of flow were measured by determining the quantities resin flowed from a nozzle of 1 mm. $\phi$ x 10 mm. $l$ at a temperature of 190° C. and a pressure of 300 kg./cm.$^2$ with use of a plunger extruding type rheometer. (Kokashiki flow tester.)

(7) Light transmittabilities were measured with use of pressed sheets of 1.4 mm. thickness and employing a wave length of 550 mm$\mu$.

In the above-mentioned test, test pieces for softening points, heat stabilities and quantities of flow were prepared by compounding 100 parts by weight of resin, 5 parts by weight of dibasic lead sulfite and 3 parts by weight of a 4:3:3 mixture of cadmium stearate, barium stearate and lead stearate, milling the mixture with mixing rolls at a temperature of 170° C. for 5 minutes and shaping into sheets of about 0.5 mm. thickness, followed by pressing and test pieces for light transmittability were prepared by compounding 100 parts by weight of resin, 5 parts by weight of dibutyl tin maleate and one part by weight of calcium stearate, and made into sheets by the above-mentioned condition, followed by pressing at a temperature of 180° C. for 15 minutes.

The softening point measured in accordance with aforesaid method of polyvinyl chloride used in the present test was 75° to 76° C. before the chlorination.

The particle sizes referred to in each example were expressed by the standard screen mesh specified in JIS.

EXAMPLE 1

Finely ground silica gels were charged into a lower part of a cylindrical glass reactor having an inside diameter of 50 mm. and a length of 1000 mm., a gas inlet at a lower part, a gas outlet at a upper part and a mantle at the outside of cylindrical part, at a height of layer of 50 mm., and upon this layer, 200 g. of polyvinyl chloride (Lucovyl GM 1200 supplier; Pechiney-Saint-Gobain) produced by a bulk polymerization process, having a specific viscosity of 0.385, a distribution of particle sizes from 250$\mu$ to 74$\mu$, an apparent specific gravity of 0.27 and a specific surface area of 0.56 m.$^2$/g. was placed. The heat sensitive part of a thermometer was inserted to the central part of the resin layer. Then nitrogen gas was sent through a flow-meter into the reaction tube from the gas inlet at a velocity of 160 l./hr. to replace the air in the interior of the reaction tube. Thereafter chlorine gas was sent into the reactor at a velocity of 60 l./hr. after mixed with the above-mentioned nitrogen gas. Thus the powdered resin formed a fluidized bed of about 500 mm. height. When ultraviolet light was irradiated from three 20 w. ultra violet lamps installed around the reaction tube, the reaction immediately commenced, raising the temperature of fluidized layer. The temperature of fluidized layer was raised from a room temperature to 55° C. in one hour by the hot water passing through the mantle and the reaction was continued for 3 hours at a temperature of 55° C. After completion of the reaction, the lamps were switched off, the feeding of chlorine was cut and the resin was washed for 30 minutes while maintaining the temperature of fluidized layer at 65° C. by hot water passing through the mantle and forming a fluidized layer with nitrogen alone. The resin taken out from the reaction tube was exposed to drying at a reduced pressure, at a temperature of 60° C. for one hour. Thus a post-chlorinated polyvinyl chloride having the same appearance as raw material resin, a specific viscosity of 0.254, a chlorine content of 65.2 percent, a softening point of 106.1° C., a heat stability of 47 minutes, a flow quantity of resin of $9.9 \times 10^{-3}$ cc./sec. and a light transmittability of 61.5 percent was obtained.

EXAMPLE 2

By the use of the same reaction apparatus and by employing the same condition as in Example 1 polyvinyl chloride produced by a bulk polymerization process (Lucovyl BS–9550, Supplier; Pechiney-Saint-Gobain) having a specific viscosity of 0.336, an apparent specific gravity of 0.51, a specific surface area of 0.26 m.²/g. and consisting of globular particles of uniform distribution range from $250\mu$ to $74\mu$ of which about more than 90 percent occupied the range from $177\mu$ to $125\mu$, was subjected to the chlorination reaction. The height of fluidized layer of resin was about 250 mm. in this case. After completion of the reaction the same treatment as in Example 1 was applied. The resulting post-chlorinated polyvinyl chloride had a specific viscosity of 0.275, a chlorine content of 66.1 percent, a softening point of 108.6° C., a heat stability of 53 minutes and flow quantity of resin of $9.6 \times 10^{-3}$ cc./sec.

In contrast to the foregoing case, the post-chlorinated polyvinyl chloride obtained by the same condition except that the nitrogen gas contained 0.55 l./hr. of cis-1,2-dichloroethylene vapor showed a specific viscosity of 0.276, a chlorine content of 65.6 percent, a softening point of 107.1° C., a flow quantity of resin of $10.3 \times 10^{-3}$ cc./sec. and a heat stability of 56 minutes. Both of the sheets produced by incorporating with a tin-type stabilizer were slightly colored. Transmittabilities of 550 mm$\mu$ light were 65.5 percent in the former case and 71.8 percent in the latter case. The transparency and heat stability have been improved by the addition of chlorinated hydrocarbon. As for the effect of production method of polyvinyl chloride, a post-chlorinated polyvinyl chloride obtained by chlorinating Geon 101 EP (Supplier; Nippon Geon; a suspension polymerization product, having a specific viscosity of 0.460) showed a chlorine content of 66.2 percent, a softening point of 109.5° C. a flow quantity of $3.7 \times 10^{-3}$ cc./sec. a heat stability of 38 minutes, in the case where dichloroethylene vapor was not used. Further, shaped sheets were colored in deep brown and the light transmittability was 40.5 percent. From the foregoing result it was concluded that the chlorination products from a bulk polymerization resin were, superior in the heat stability, transparency and fluidizability compared with those from a suspension polymerization resin and the incorporation of small amount of dichloroethylene vapor in the reaction system is effective in improving heat stability and transparency.

EXAMPLE 3

Finely ground silica gel was filled up to the height of 100 mm. upon a perforated plate placed at the bottom of a stainless cylindrical reactor having an inside diameter of 200 mm. and a height of 900 mm., a gas inlet at the lower part, a gas outlet at the upper part and a mantle at the cylindrical part. A glass cylinder having an inside diameter of 100 mm. and a height of 600 mm., and the bottom of which was fused, was inserted in the central part of the cylinder and the same three ultra violet-light lamps as in Example 1 were placed in this glass cylinder.

Five kg. of polyvinyl chloride (Lucovyl G.B.–9550 Supplier; Pechiney-Staint-Gobain) produced by a bulk polymerization process was charged to the reactor and dried at a temperature of 60° C. for one hour while being fluidized by nitrogen current sent from the bottom at a velocity of 1500 l./hr. and while hot water was being circulated in the mantle. After drying, the temperature of resin was lowered to room temperature and chlorine gas was sent to the reactor at a velocity of 700 l./hr. together with $N_2$ gas. The ultra violet-light lamps were switched on, the reaction temperature was elevated to 50° C. in one hour, and the reaction was continued for 3 hours.

After completion of the reaction, the lamps were switched off, chlorine gas was cut off and the resin was washed with nitrogen gas for 30 minutes while maintaining the temperature of fluidized layer at 60° C.

On comparison polyvinyl chloride (Kanevinyl S–1008, Supplier; Kanegafuchi Chemical Co.) produced by a suspension polymerization process was subjected to the same reaction. The properties of resulting products in both cases were tabulated as follows:

RAW MATERIAL POLYVINYL CHLORIDE

| Polyvinyl chloride | Specific viscosity | Apparent specific gravity | Specific surface area, m.²/g. | Grain size over $177\mu$ | Distribution, percent | |
|---|---|---|---|---|---|---|
| | | | | | $177$–$115\mu$ | $115$–$74\mu$ |
| A (Lucovyl GB–9550) | 0.336 | 0.51 | 0.26 | 0.7 | 92.2 | 6.7 |
| B (Kanevinyl S–1008) | 0.313 | 0.56 | 0.23 | 0.5 | 66.0 | 32.5 |

CHLORINATED POLYVINYL CHLORIDE

| Polyvinyl chloride | Chlorine content, percent | Specific viscosity | Softening point, ° C. | Heat stability, min. | Light transmittability, percent |
|---|---|---|---|---|---|
| A (Lucovyl GB–9550) | 63.4 | 0.297 | 99.3 | 49 | 72.6 |
| B (Kanevinyl S–1008) | 60.5 | 0.274 | 88.5 | 45 | 43.0 |

It was concluded from the foregoing result that the polyvinyl chloride produced by a bulk polymerization showed greater reaction velocity of chlorination than that produced by a suspension polymerization due to the porosity of resin particle, better heat stability due to its inherently higher purity, less coloring when shaped into transparent sheets and superior transparency.

EXAMPLE 4

With use of the same apparatus as in Example 3, polyvinyl chloride products produced by a bulk polymerization process and possessing various specific viscosities (Pechiney-Saint-Gobain's Lucovyl G.B.–9550, 1150 and 1850) were chlorinated. In each instance, the reaction temperature was 55° C., the velocities of chlorine gas sent and of nitrogen gas sent were 1000 l./hr. and 1500 l./hr. respectively, and the reaction time was 4 hours. Other operational conditions were the same as in Example 3. As contrast, polyvinyl chloride products produced by a suspension polymerization process (Geon 103 EP and Kanevinyl 1001) were also chlorinated. The properties of products in both cases were as follows:

chloride had a slight variation but it is in the range of from 63.7 percent to 64.4 percent. The softening point of

RAW MATERIAL POLYVINYL CHLORIDE

| Polyvinyl chloride | Specific viscosity | Apparent specific gravity | Specific surface area, m.²/g. | Grain size over 177μ | Distribution, percent | |
|---|---|---|---|---|---|---|
| | | | | | 177-115μ | 115-74μ |
| A (Lucovyl GB-9550) | 0.336 | 0.51 | 0.26 | 0.7 | 92.2 | 6.7 |
| B (Lucovyl GB-1150) | 0.390 | 0.40 | 0.24 | 1.5 | 69.8 | 26.9 |
| C (Lucovyl GB-1850) | 0.591 | 0.51 | 0.25 | 1.1 | 79.4 | 19.4 |
| D (Geon 103EP) | 0.370 | 0.50 | 0.22 | 2.4 | 69.2 | 27.3 |
| E (Kanevinyl S-1001) | 0.358 | 0.56 | 0.20 | 6.2 | 77.0 | 11.6 |

CHLORINATED POLYVINYL CHLORIDE

| Polyvinyl chloride | Chlorine content, percent | Specific viscosity | Softening point, °C. | Heat stability, min. | Flow quantity, ×10⁻³ cc/sec. | Light transmittability, percent |
|---|---|---|---|---|---|---|
| A | 65.0 | 0.275 | 105.2 | 60 | 12.2 | 72.0 |
| B | 64.9 | 0.292 | 104.7 | 48 | 14.8 | 73.5 |
| C | 64.4 | 0.491 | 104.0 | 49 | 13.5 | 65.2 |
| D | 64.4 | 0.309 | 103.5 | 46 | 8.8 | 47.2 |
| E | 64.5 | 0.294 | 100.5 | 40 | 9.6 | 41.2 |

It was concluded from the foregoing result that the bulk polymerization product showed better heat stability, less coloration and transparency when fabricated into transparent sheets, better than the suspension polymerization product. Further, from the viewpoint of flow quantity, the former was better.

EXAMPLE 5

On the top of the reactor of Example 3, a stainless pipe having a diameter of 14 mm. and a length of 500 mm. was installed for charging raw material polyvinyl chloride, and under the perforated plate of the bottom of the reactor, another stainless pipe having a diameter of 14 mm. and a length of 1000 mm. was installed for discharging reaction product. Thus it was arranged that polyvinyl chloride was continuously charged to the resin fluidized layer via nitrogen gas, and the reaction product was continuously discharged from the reaction system through the above mentioned discharge pipe.

Five kg. of polyvinyl chloride obtained by a bulk polymerization process (Saint-Gobain's Lucovyl G.B.–9550) was charged into the reactor as in Example 3 and subjected to fluidizing drying. Then, the reaction was carried out at a temperature of 55° C. for 3 hrs. with a nitrogen gas sending velocity of 1500 l./hr. and a chlorine gas sending velocity of 1000 l./hr. From 3 hrs. after commencement of the reaction, dried resin was fed to the reactor through the raw material pipe on the top with a velocity of 1 kg./hr., post-chlorinated polyvinyl chloride was withdrawn from the discharge pipe with a velocity of about 1.2 kg./hr. and a continuous reaction was carried out for 30 hours. The total amounts of polyvinyl chloride feed and the total amount of post-chlorinated polyvinyl chloride withdrawal were 30 kg. and 35.6 kg. respectively. The chlorine content of the post-chlorinated polyvinyl chloride had a slight variation but it is in the range of from 63.7 percent to 64.4 percent. The softening point of the post-chlorinated polyvinyl chloride was in the range of from 101° to 103° C.

What is claimed is:

1. A post-chlorinated polyvinyl chloride having a high softening point, high heat stability and excellent light transmittability, said post-chlorinated polyvinyl chloride being produced by reacting a bulk-polymerized, dried, powdery polyvinyl chloride with chlorine gas at 40–100° C. under the influence of ultraviolet light and in a fluidized bed created by fluidizing said bulk polymerized polyvinyl chloride with said chlorine gas.

2. A post-chlorinated polyvinyl chloride in accordance with claim 1, wherein during said post-chlorination a vapor of a lower aliphatic chlorinated hydrocarbon is used in addition to said chlorine gas to effect said fluidization.

3. A post-chlorinated polyvinyl chloride in accordance with claim 1, wherein during said post-chlorination an inert gas is used in addition to said chlorine gas to effect said fluidization.

4. A post-chlorinated polyvinyl chloride in accordance with claim 3, wherein said inert gas is nitrogen.

References Cited

UNITED STATES PATENTS

| 2,426,080 | 8/1947 | Chapman et al. | 260—92.8 |
| 2,590,651 | 3/1952 | Rosenberg | 204—163 |
| 2,890,213 | 6/1959 | Noeske | 260—94.9 |

SAMUEL H. BLECH, Primary Examiner

R. B. TURER, Assistant Examiner

U.S. Cl. X.R.

260—23, 45.75, 92.8